United States Patent
Mates

(10) Patent No.: US 7,197,628 B2
(45) Date of Patent: Mar. 27, 2007

(54) METHOD AND APPARATUS FOR EXECUTION FLOW SYNONYMS

(75) Inventor: John W. Mates, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 10/733,014

(22) Filed: Dec. 10, 2003

(65) Prior Publication Data

US 2005/0132169 A1      Jun. 16, 2005

(51) Int. Cl.
*G06F 9/30* (2006.01)
(52) U.S. Cl. ..................................... 712/209
(58) Field of Classification Search ................. 712/209
See application file for complete search history.

(56) References Cited

U.S. PATENT DOCUMENTS

| | | | |
|---|---|---|---|
| 5,892,934 A | | 4/1999 | Yard |
| 6,438,700 B1 * | | 8/2002 | Adusumilli ................ 713/323 |
| 6,654,875 B1 * | | 11/2003 | Hartnett et al. ............. 712/211 |
| 2002/0169948 A1 | | 11/2002 | Kondo et al. |
| 2004/0186979 A1 | | 9/2004 | Janke et al. |
| 2005/0055677 A1 * | | 3/2005 | Nanja et al. ................ 717/136 |

OTHER PUBLICATIONS

Kim et al: Imlementing Optimizations at Decode Time; Proceedings of the 29th annual Int'l Symposium on Computer Architecture IEEE 2002; 12 pages.
PCT/US2004/038979 Int'l Search Report & Written Opinion dated Apr. 4, 2006.

* cited by examiner

*Primary Examiner*—William M. Treat
(74) *Attorney, Agent, or Firm*—Guojun Zhou

(57) ABSTRACT

A method and apparatus for utilizing multiple microcode flow synonyms or hardware flow synonyms for an instruction is disclosed. In one embodiment, a microcode synonym is created for execution on two or more execution units of differing types. One microcode synonym may be chosen for execution depending upon the availability status of the execution units. In another embodiment, several microcode synonyms may be chosen for execution. The results of the first microcode synonym to complete execution may be retired. If the results of execution of two microcode synonyms do not match, a fault exception may be raised.

40 Claims, 8 Drawing Sheets

TRACE CACHE

METHOD AND APPARATUS FOR EXECUTION FLOW SYNONYMS

FIELD

The present disclosure relates generally to microprocessors, and more specifically to microprocessors including several execution units of differing types.

BACKGROUND

Modern microprocessors may support the execution of complex instructions by converting them into a group of simpler instructions. The resulting group of simpler instructions may be called a "flow". There may be flows consisting of micro-operations and described by microcode. These flows may be called microcode flows. There may also be flows whose conversion into a group of simpler instructions may be performed by a set of hardware logic. These flows may be called hardware flows. A processor may first decode the instruction into a microcode flow or a hardware flow, and then schedule the resulting microcode flow for execution on one or more execution units.

The execution units of a processor may be of varying types. For example, one processor may include one or more of the following types of execution units in its architecture: integer arithmetic, floating-point arithmetic, multimedia arithmetic, branch calculations and control; and memory load/store. Generally a microcode flow or a hardware flow representation of an instruction will be targeted to execute on one of these types of execution unit. However, often the targeted execution unit is not available or at least less available than others. The reason it may be not available or less available may be as simple as that execution unit is currently executing another flow corresponding to another instruction. But in some cases the targeted execution unit may be less available because it is turned off as a result of the processor entering a reduced power mode. To execute the microcode flow or hardware flow, the processor must first emerge from such a reduced power mode. In some cases, the targeted execution unit may be less available or not available due to a soft or hard failure. Each of these situations raises issues for the execution of the microcode flow or hardware flow representation of the instruction.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for a processor to use multiple microcode flow synonyms and hardware flow synonyms corresponding to a single instruction, and capable of execution on execution units of differing types. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of an Itanium® Processor Family (IPF) processor or in a Pentium® family processor such as those produced by Intel® Corporation. However, the invention may be practiced in other kinds of processors that may wish to use multiple microcode synonyms or hardware synonyms.

Figure 1:
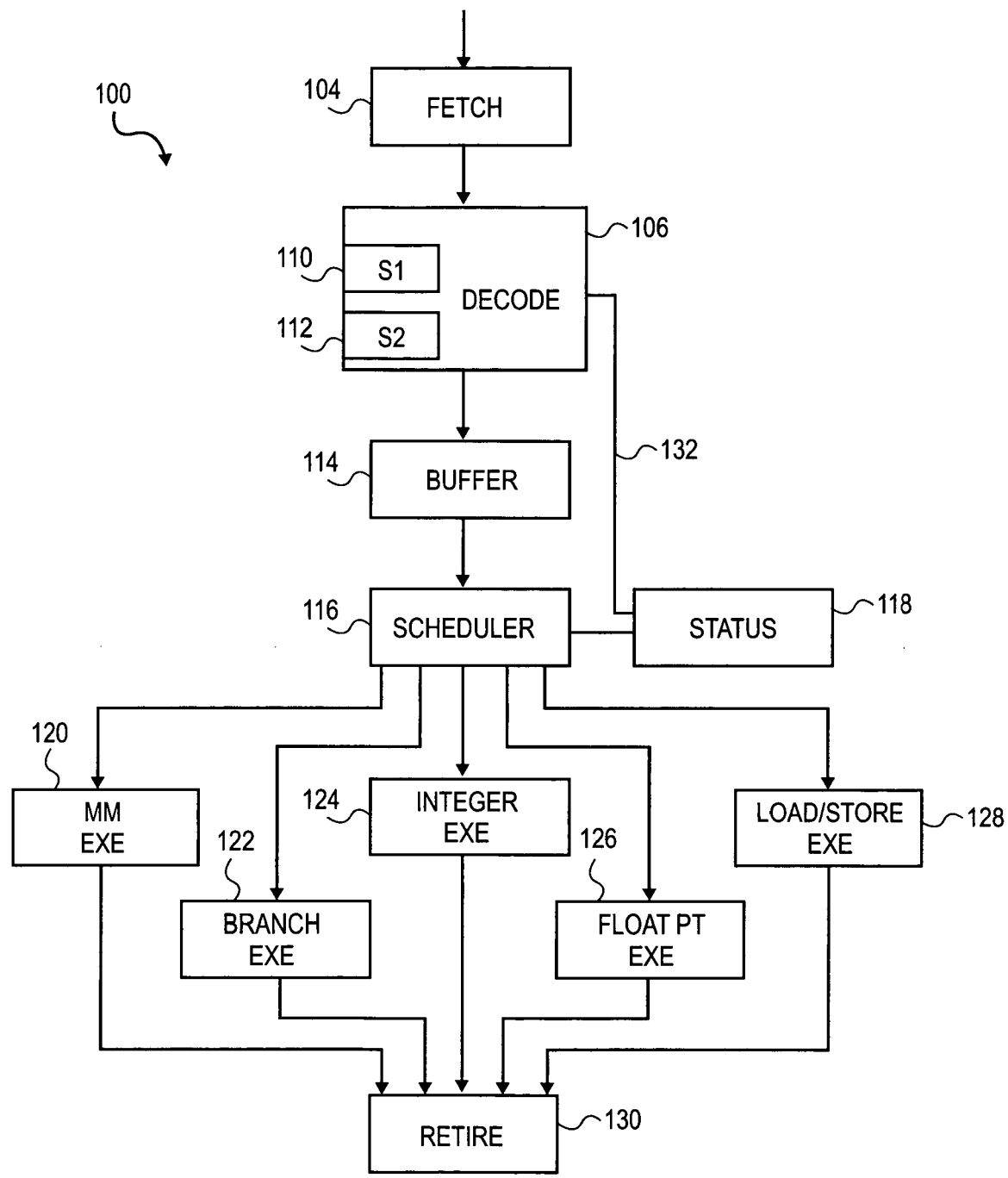
FIG. 1 is a block diagram showing portions of a pipeline utilizing flow synonyms in a processor, according to one embodiment.

Referring now to FIG. 1, a diagram showing portions of a pipeline 100 utilizing flow synonyms in a processor is shown, according to one embodiment. The stages of the FIG. 1 pipeline 100 are shown for the purpose of discussing the use of flow synonyms in a processor. In other embodiments, the stages of the pipeline may have differing functions and orders. FIG. 1 shows a representative collection of execution units in the pipeline 100, with multimedia execution unit 120, branch execution unit 122, integer execution unit 124, floating-point execution unit 126, and memory load/store execution unit 128. In other embodiments, there may be more than one each of these execution units, and there may be differing types of execution units present.

A fetch stage 104 may fetch or prefetch program instructions from a cache or caches, and supply these instructions to a decode stage 106. The decode stage 106 needs to convert these instructions into a group of simpler instructions called a flow for later execution in the execution units. Microcode flows may be stored in a microcode read-only-memory (ROM) within decode stage 106. In other embodiments, microcode flows may be stored in non-volatile or writeable memory, such as Flash memory. Hardware flows may be implemented using a set of hardware logic elements within decode stage 106. In a conventional processor, there would be a one-to-one correspondence between an instruction and its flow, either a microcode flow or a hardware flow. However, in one embodiment of the present disclosure multiple and distinct copies of flows, including microcode flows or hardware flows, may be present for some instructions. If these multiple and distinct copies of flows for a given instruction produce the same results, they may be called flow synonyms. Flow synonyms may be microcode flow synonyms or hardware flow synonyms each capable of execution on a given type of execution unit, but in many useful cases they will be capable of execution on differing types of execution units.

In one embodiment, a pair of flow synonyms, flow synonym 1 110 and flow synonym 2 112, may be included within decode stage 106. In other embodiments, there may be more than two flow synonyms for an instruction. Each of flow synonym 1 110 and flow synonym 2 112 may be a microcode flow capable of representing a particular instruction, or they may be a hardware flow, or a mix of the two kinds. The decode stage 106 may have logic to select either flow synonym 1 110 or flow synonym 2 112 for decoding the corresponding instruction for subsequent execution depending upon processor status or other rules. The decode stage 106 may examine a status register 118 to determine whether particular execution units are less available or more available. In one embodiment, the status register 118 may be an existing status register required by a scheduler stage 116. The indication of whether a particular execution unit is less available may indicate whether the particular execution unit is currently occupied in execution, or it may indicate that the particular execution unit is powered down as part of a processor reduced power mode. In some cases the status register 118 may indicate soft or hard failures being detected in an execution unit. In any case, the decode stage 106 may select a microcode synonym or a hardware synonym for decoding an instruction when the execution unit utilized by that microcode synonym or hardware synonym is found to be more available. When the status register 118 does not indicate processor reduced power mode or soft or hard failures, the decode stage 106 may take these situations into account by using various selection rules.

In cases where several execution units are more available, decoder stage 106 may need to choose one microcode synonym or hardware synonym from among several corresponding to the several more available execution units. In one embodiment the choosing may be based upon system performance rules. In another embodiment, the choosing may be based simply upon a default selection basis. In another case where all of the corresponding execution units are less available, then decode stage 106 may have to arbitrate among several microcode synonyms or hardware synonyms based upon rules or history. In one embodiment, the decode stage 106 may determine system performance of various arbitration selections by examining local or global history, in a manner analogous to that performed in branch prediction circuitry. In other embodiments, the arbitration may be performed by a default selection.

In another embodiment, decode stage 106 may select more than one microcode synonym or hardware synonym, or even all of the microcode synonyms or hardware synonyms, available for a given instruction, and send them down to the scheduler 116. In one embodiment, let flow synonym S1 110 be a floating-point addition targeted for a floating-point execution unit 126 and let flow synonym S2 112 be a floating-point addition targeted for an integer execution unit 124. Normally flow synonym S1 110 would execute faster than flow synonym S2 112. However, because floating-point execution unit 126 may be heavily occupied in certain circumstances, sometimes S2 112 may finish execution first. So in this embodiment, scheduler 116 may schedule both flow synonyms S1 110 and S2 112 for execution on the respective targeted execution units. As only one result should be retired and change processor state, retirement stage 130 may retire whichever flow synonym S1 110 or S2 112 completes execution first. In processors that support predication, retirement stage 130 may then predicate off the slower-executing flow synonym.

In another embodiment, decode stage 106 may again select more than one flow synonym, or all of the flow synonyms, available for a given instruction, and send them down to the scheduler 116. In one embodiment, again let flow synonym S1 110 be a floating-point addition targeted for a floating-point execution unit 126 and let flow synonym S2 112 be a floating-point addition targeted for an integer execution unit 124. In this case scheduler 116 may again schedule both flow synonyms S1 110 and S2 112 for execution on the respective execution units. The utilization of the two flow synonyms S1 110 and S2 112 executing on floating-point execution 126 and integer execution unit 124, respectively, may provide information about soft or hard errors arising by failures in the execution units. So in this embodiment, retirement stage 130 may wait until both flow synonyms complete execution and compare the results. If the results match, then there is no indication of a problem. However, if the results do not match, an exception may be raised and further investigations into the hardware status may be made.

Many if not most instructions may be candidates for having microcode synonyms or hardware synonyms. Numeric calculation instructions, such as integer arithmetic and floating-point arithmetic, may be natural candidates in that they may be performed on differing types of execution units but with differing levels of performance. Even control instructions may be performed on differing types of execution units. For example, a conditional branch instruction may most efficiently be executed on a branch execution unit. However, it is possible to arrange for a branch instruction to be performed by another type of execution unit. For example, a branch instruction could be executed on an integer execution unit. The integer execution unit could make the conditional determination, and, if the branch should be "not taken" the rest of the microcode could be a no-operation. This would permit the next instruction to be the next instruction sequentially in the program flow. If, however, the branch should be "taken", then the integer execution unit could be forced to perform an improper execution, such as dividing by zero. This would bring into play an exception handler which could supply the "taken" branch next instruction address.

Figure 2:
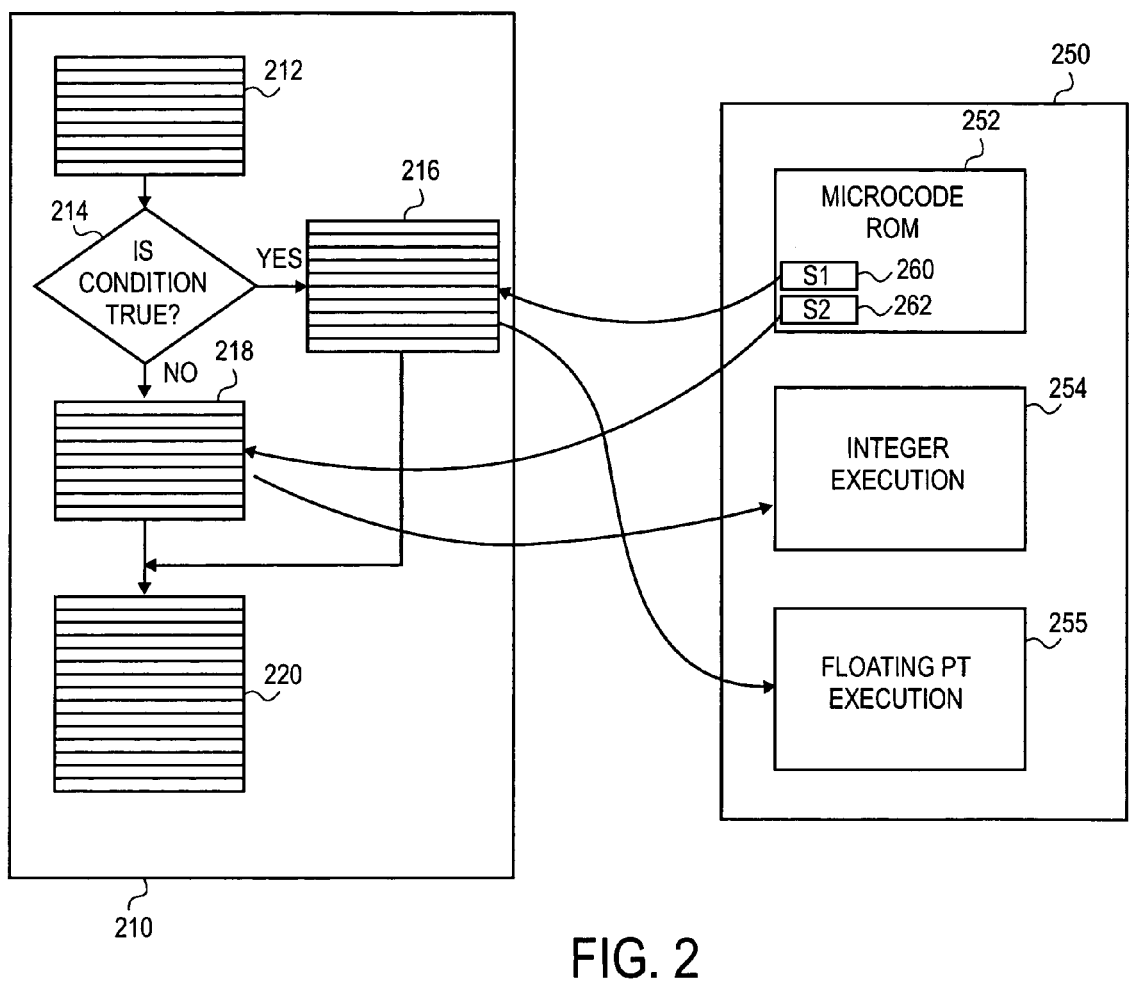
FIG. 2 is a diagram showing program execution of a program decoded into microcode synonyms, according to one embodiment.

Referring now to FIG. 2, a diagram showing program execution of a program decoded into microcode synonyms is shown, according to one embodiment. Let software listing 210 show a progression of microcode flows, including microcode synonyms, as the decode stage decodes a series of instructions. Then let microcode flow 212 represent a first instruction. Let a second instruction be represented by two microcode synonyms S1 260 and S2 262, as contained in microcode ROM 252. A conditional determination 214 may be performed by the decode stage to select whether to represent the second instruction by microcode flow 216 corresponding to microcode synonym S1 260, or instead to represent the second instruction by microcode flow 218 corresponding to microcode synonym S2 262. As one example, the conditional determination 214 may be to determine whether the processor has exited from a reduced power mode that powered down the floating-point execution units 255. If so, then a microcode synonym that executes a floating-point instruction on a floating-point execution unit may be selected. If not, and the floating-point execution unit 255 is still powered down, then a microcode synonym that executes the floating-point instruction on an integer execution unit 254 may be selected. After either microcode flow 216 or 218, a third instruction may be decoded into microcode flow 220.

In one embodiment, the conditional determination 214 may be performed by logic within the decode stage. In another embodiment, the conditional determination 214 may be part of a bundle in microcode ROM 252 that also includes the two microcode synonyms S1 260 and S2 262. In this embodiment, the conditional determination 214 may be changed with updates to the microcode ROM 252 in those cases where microcode ROM 252 is implemented as writable non-volatile memory. Here the conditional determination 214 may be loaded into the decoder stage and performed by circuitry in the decoder stage. In another embodiment, microcode ROM 252 could be replaced by additional circuitry within a decode stage that could implement hardware flow synonyms instead of the microcode synonyms S1 260 and S2 262.

Figure 3:
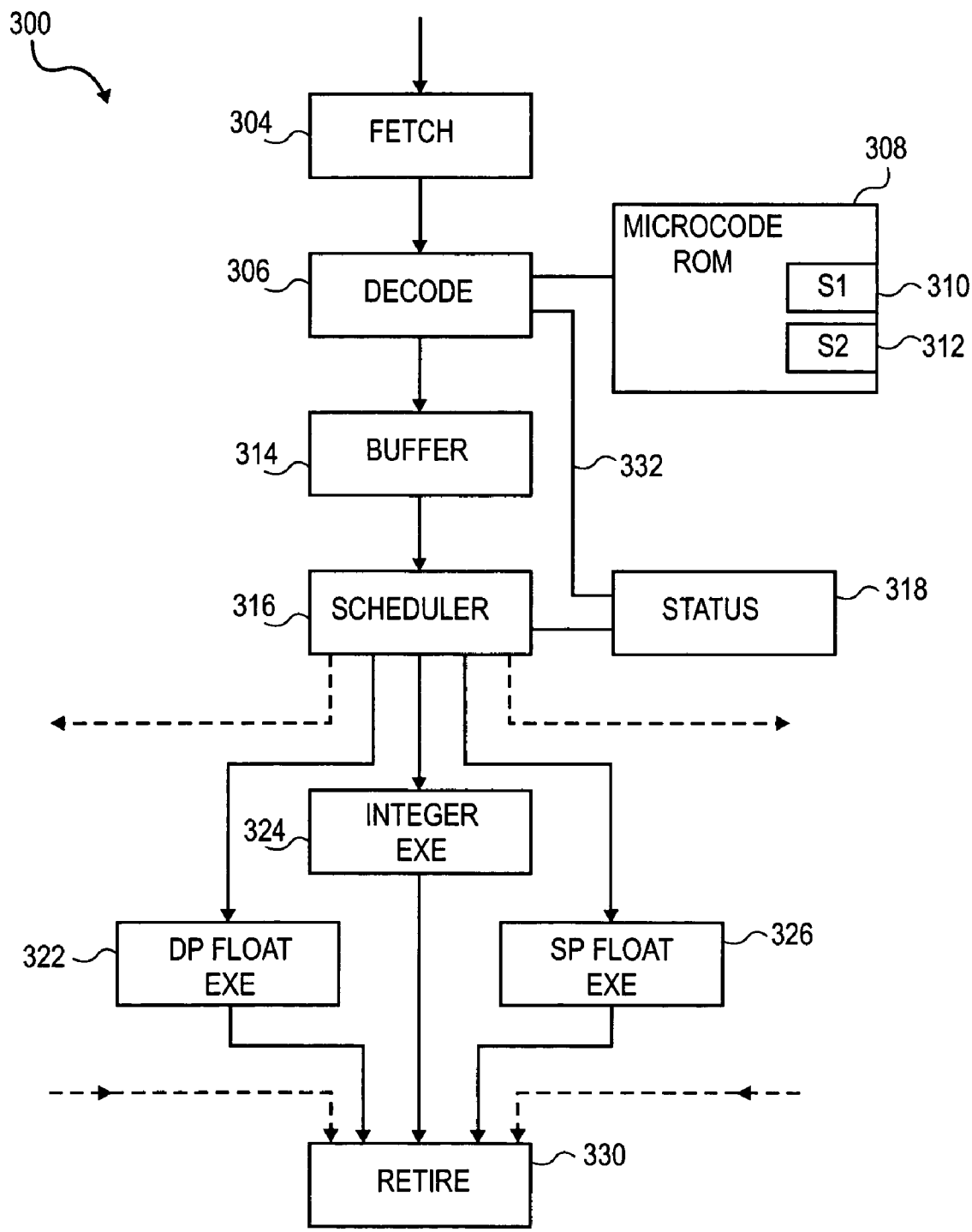
FIG. 3 is a block diagram showing portions of a pipeline utilizing microcode synonyms in a processor, according to another embodiment of the present disclosure.

Referring now to FIG. 3, a block diagram showing portions of a pipeline 300 utilizing microcode synonyms in a processor is shown, according to another embodiment of the present disclosure. Many of the circuit stage shown in FIG. 3 may be similar in function to the equivalent stages shown above in connection with FIG. 1. In current processor designs it may be found desirable to have one or more double-precision (or extended precision) floating-point execution units 322. However, considerations of power and integrated circuit die size also may make it desirable to include one or more single-precision floating-point execution units 326. The number of each type may be influenced by statistical analysis of the relative number of single-precision versus double-precision (or extended precision) floating-point instructions in the kinds of software expected to be executed on the processor. But as these are statistical averages, it may often occur that more or fewer of each type of instruction are executed in a given program.

Therefore, in one embodiment, microcode ROM 308 may contain two microcode synonyms for a double-precision floating-point instruction. The microcode synonym S1 310 may be targeted to perform a double-precision floating-point instruction on a double-precision floating-point execution unit 322. The microcode synonym S2 312 may be targeted to perform a double-precision floating-point instruction on a single-precision floating-point execution unit 326. The decode stage 306 may determine which of the two microcode synonyms S1 310, S2 312, to send on to the scheduler stage 316 based upon system performance considerations. In one embodiment, the determination may be supported by reading system status from a status register 318. For example, when a double-precision floating-point execution unit is more available, then generally the microcode synonym S1 310 may be selected. But when the double-precision floating-point execution unit is less available and a single-precision floating-point execution unit is more available, then the microcode synonym S2 312 may be selected.

In another embodiment, the microcode synonym S1 310 may be targeted to perform a single-precision floating-point instruction on a single-precision floating-point execution unit 326. The microcode synonym S2 312 may be targeted to perform a single-precision floating-point instruction on a double-precision floating-point execution unit 322. The decode stage 306 may again determine which of the two microcode synonyms S1 310, S2 312, to send on to the scheduler stage 316 based upon system performance considerations. In one embodiment, the determination may again be supported by reading system status from a status register 318. For example, when a single-precision floating-point execution unit 326 is more available, then generally the microcode synonym S1 310 may be selected. But when the single-precision floating-point execution unit 326 is less available and a double-precision floating-point execution unit 322 is more available, then the microcode synonym S2 312 may be selected.

In other embodiments, there may be a third microcode synonym present in microcode ROM 308. For example, a single-precision floating-point instruction may have microcode synonyms targeted for execution on single-precision floating-point execution units 326, on double-precision floating-point execution units 322, or on integer execution units 324. There may be no particular limit to the number of microcode synonyms for a given instruction. In another embodiment, microcode ROM 308 could be replaced by additional circuitry within a decode stage that could implement hardware flow synonyms instead of the microcode synonyms S1 310 and S2 312.

Figure 4:
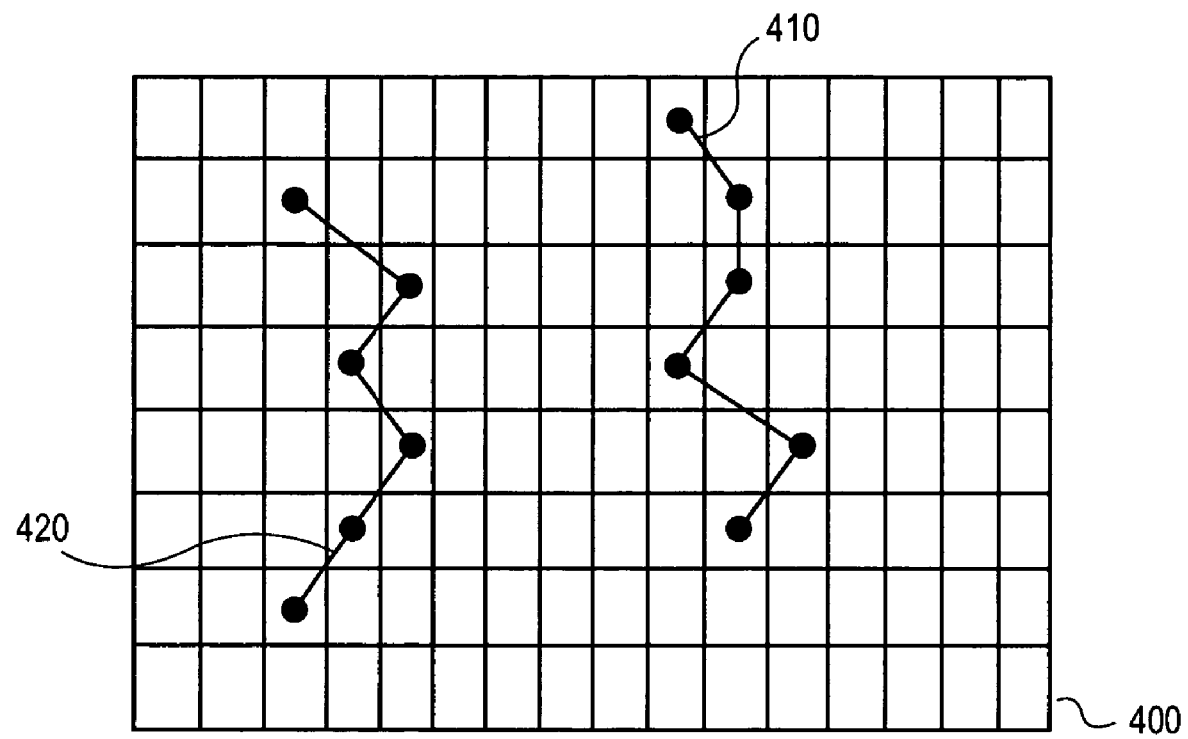
FIG. 4 is a diagram showing microcode synonyms occurring as traces in a trace cache, according to one embodiment of the present disclosure.

Referring now to FIG. 4, a diagram showing microcode synonyms occurring as traces in a trace cache is shown, according to one embodiment of the present disclosure. In the FIG. 1 embodiment a buffer stage 114 is shown for the temporary holding of microcode flows, including microcode synonyms, after their issuance from the decode stage 106. Each decoded instruction is used only once, when scheduled, and is thereafter discarded.

In order to re-use decoded instructions, the trace cache was developed. A trace cache 400 may store the decoded microcode flows as a linked-together "trace" of micro-operations. The trace cache 400 may include several ways (here shown as columns) and sets (here shown as rows). At each intersection of a way and set a micro-operation of the microcode flow may be located, along with a location indicator of the way and set of the next micro-operation in the microcode flow. Examples of traces are shown in FIG. 4 as traces 410, 420. Because of the internal linking in the trace, the microcode flow may be easy to retrieve for use. After the original decoding of an instruction into a microcode flow and the construction of the corresponding trace, the trace may be re-used many times whenever the corresponding instruction is scheduled for execution.

Because the traces within a trace cache are left in place for reuse, the decode stage may not be able to issue differing microcode synonyms for each repetition of the instruction. Whichever microcode synonym that is currently instantiated as a trace will simply be re-used. For this reason, in order to utilize differing microcode synonyms in a trace cache the decode stage may need to issue multiple microcode synonyms to the trace cache and have each of them built into a trace. The selection of which trace, corresponding to the selection of which microcode synonym, to use at a particular instance of an instruction may need to be performed in circuitry of the trace cache rather than in the decode stage. Similarly, when the trace cache needs to eject the flows corresponding to a given instruction, the trace cache may need to be capable of ejecting all the microcode synonyms resident within the trace cache.

Figure 5:
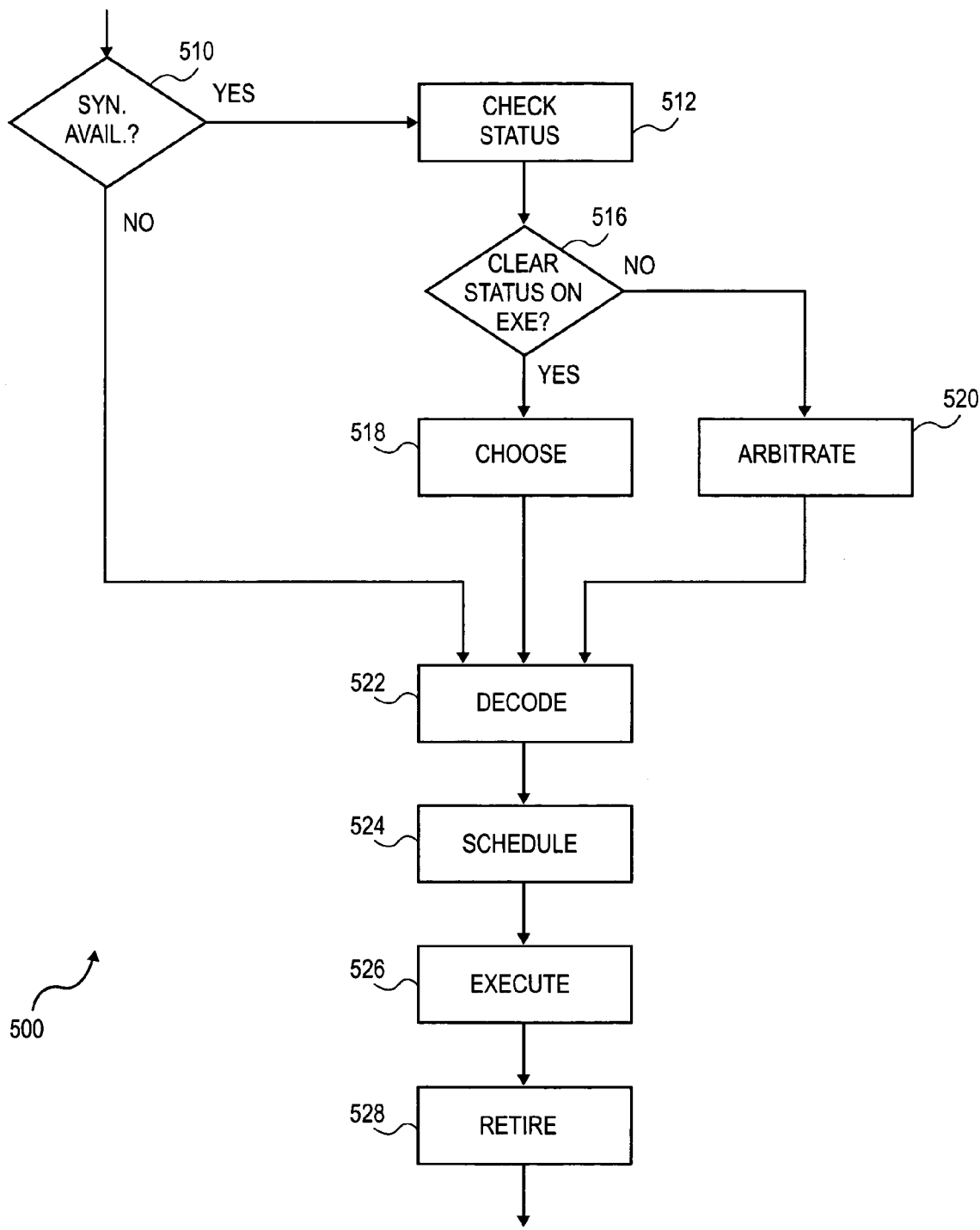
FIG. 5 is a flowchart showing a method of utilizing microcode synonyms, according to one embodiment of the present disclosure.

Referring now to FIG. 5, a flowchart showing a method 500 of utilizing flow synonyms is shown, according to one embodiment of the present disclosure. Although microcode flow synonyms are discussed in the FIG. 5 flowchart, in other embodiments hardware flow synonyms may be used. An instruction may enter the decision block 510, where it may be determined whether microcode flow synonyms exist for that instruction. If not, then method 500 exits decision block 510 via the NO path and the single microcode flow is decoded in decode block 522. However, if two or more microcode flow synonyms exist for the instruction, then the method exits decision block 510 via the YES path and the status of the execution units may be checked in block 512.

Then in decision block 516 it may be determined whether there is a clear status on one or more of the execution units targeted by the microcode flow synonyms. In one embodiment, "clear status" may indicate that an execution unit is more available. If not, then the method exits decision block 516 via the NO path and in block 520 an arbitration is made to select a microcode flow synonym. That microcode flow synonym is then sent on to the decode block 522. If so, then the method exits decision block 516 via the YES path and in block 518 a microcode flow synonym is chosen. If only one execution unit is more available, then the microcode flow synonym targeted for that execution unit may be selected. If more than one execution unit is more available, then a microcode flow synonym targeted for one of the more available execution units may be selected by other rules, such as a default selection. In any case, then the decode block 522 decodes the instruction using the microcode flow synonym.

Upon leaving the decode block 522, the method then may schedule the microcode flow synonym in schedule block 524 prior to execution on the targeted execution unit in execute block 526. The results of the execution may then be retired in retirement block 528.

Figure 6:
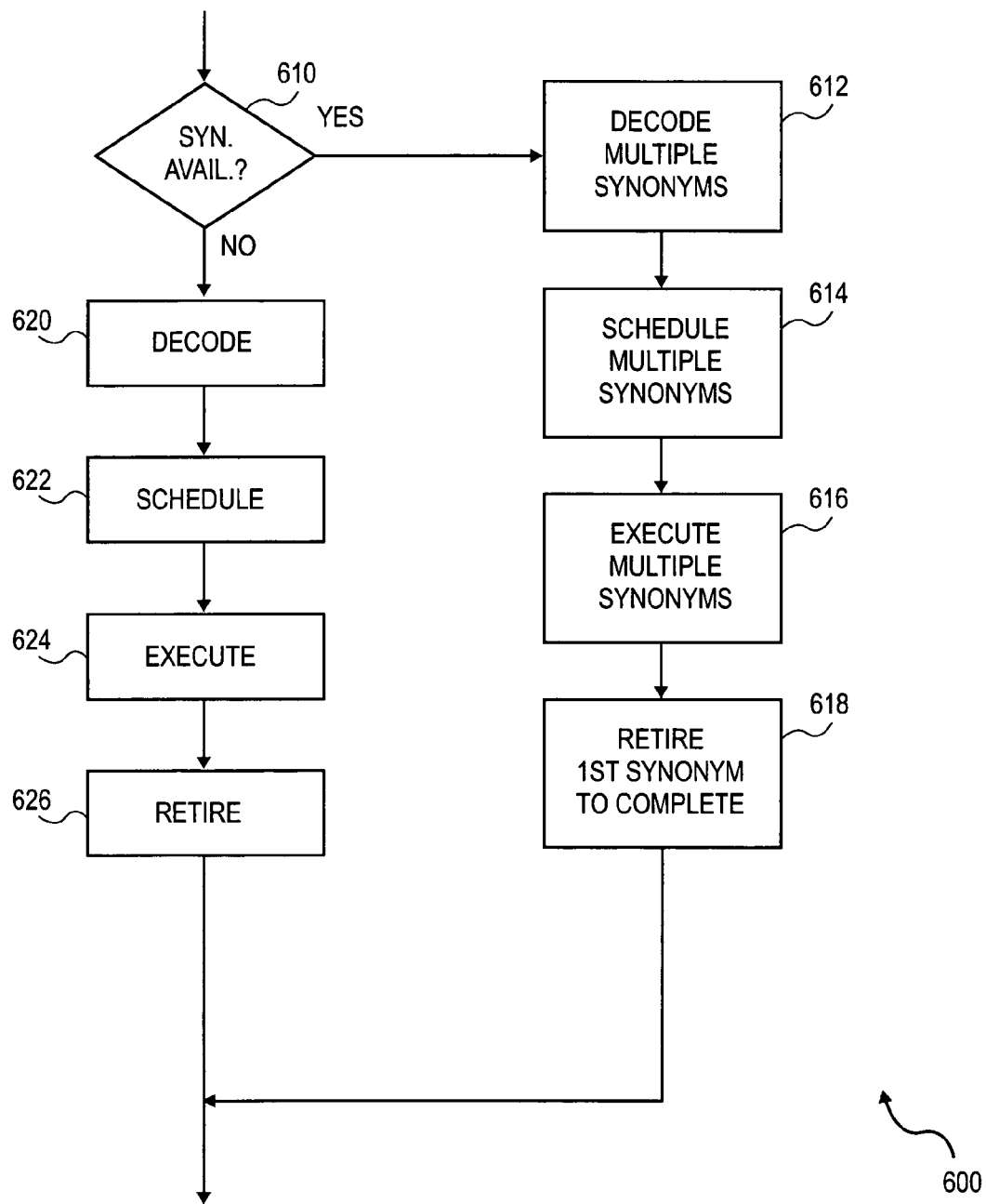
FIG. 6 is a flowchart showing a method of utilizing microcode synonyms, according to another embodiment of the present disclosure.

Referring now to FIG. 6, a flowchart showing a method 600 of utilizing flow synonyms is shown, according to another embodiment of the present disclosure. Although microcode flow synonyms are discussed in the FIG. 6 flowchart, in other embodiments hardware flow synonyms may be used. An instruction may enter the decision block 610, where it may be determined whether microcode flow synonyms exist for that instruction. If not, then method 600 exits decision block 610 via the NO path and the single microcode flow is treated conventionally in blocks 620 through 626. However, if two or more microcode flow synonyms exist for the instruction, then the method exits decision block 610 via the YES path.

In block 612, the decoder may issue two or more microcode flow synonyms for the instruction under consideration. Then in block 614 these two or more microcode flow synonyms may be scheduled for execution when the targeted execution units are more available. These execution units then execute, in block 616, the corresponding microcode flow synonyms. The retirement stage may, in block 618, take the results of the first microcode flow synonym to complete execution and retire those results. In other embodiments, the retirement stage may permit all the microcode flow synonyms to complete and compare the results before retirement. If some of the results do not match, then the retirement stage may raise an exception indicating hard or soft errors in the processor.

Figure 7A:
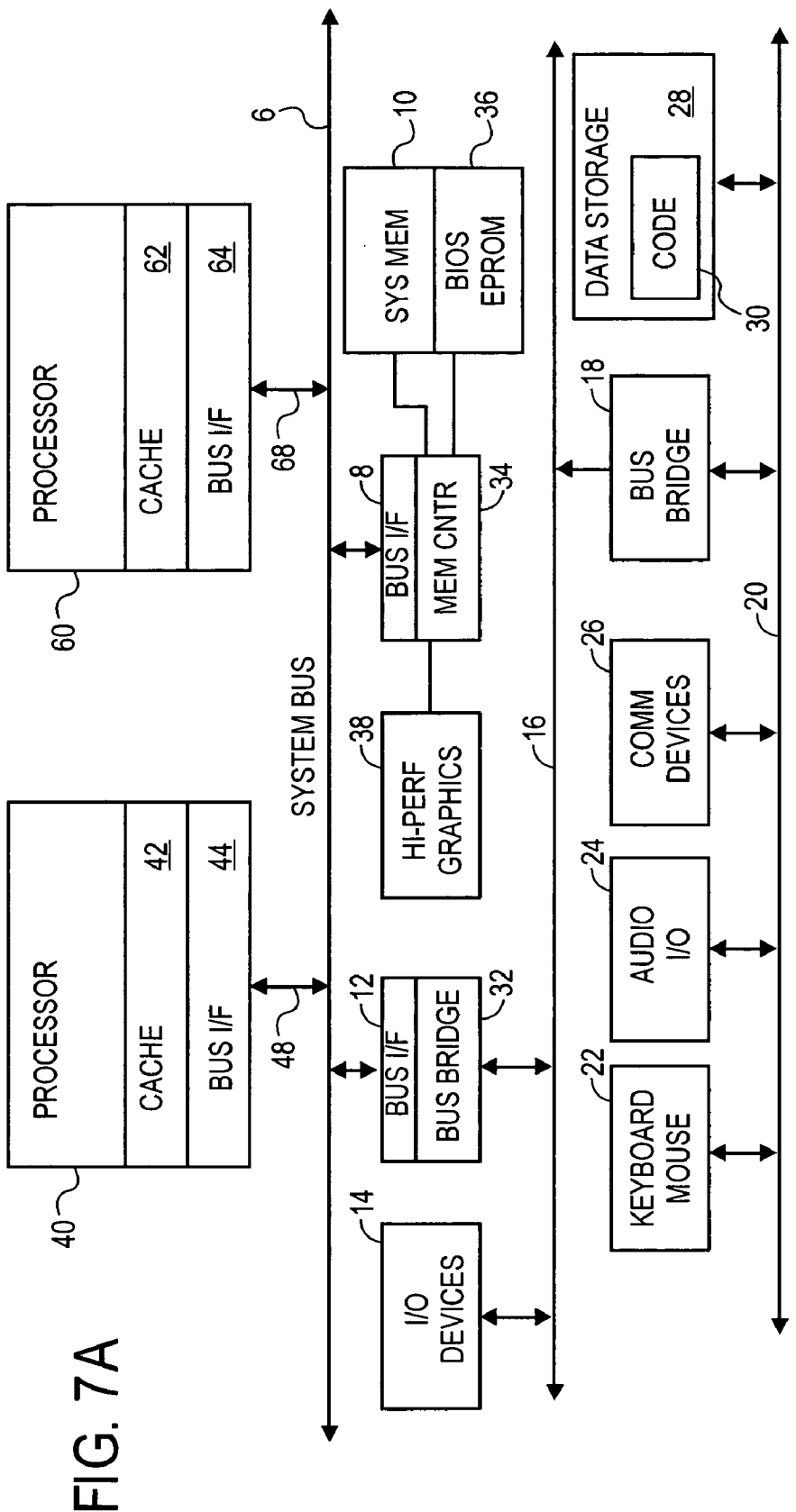
FIGS. 7A and 7B are block diagrams of microprocessor systems, according to two embodiments of the present disclosure.
Figure 7B:
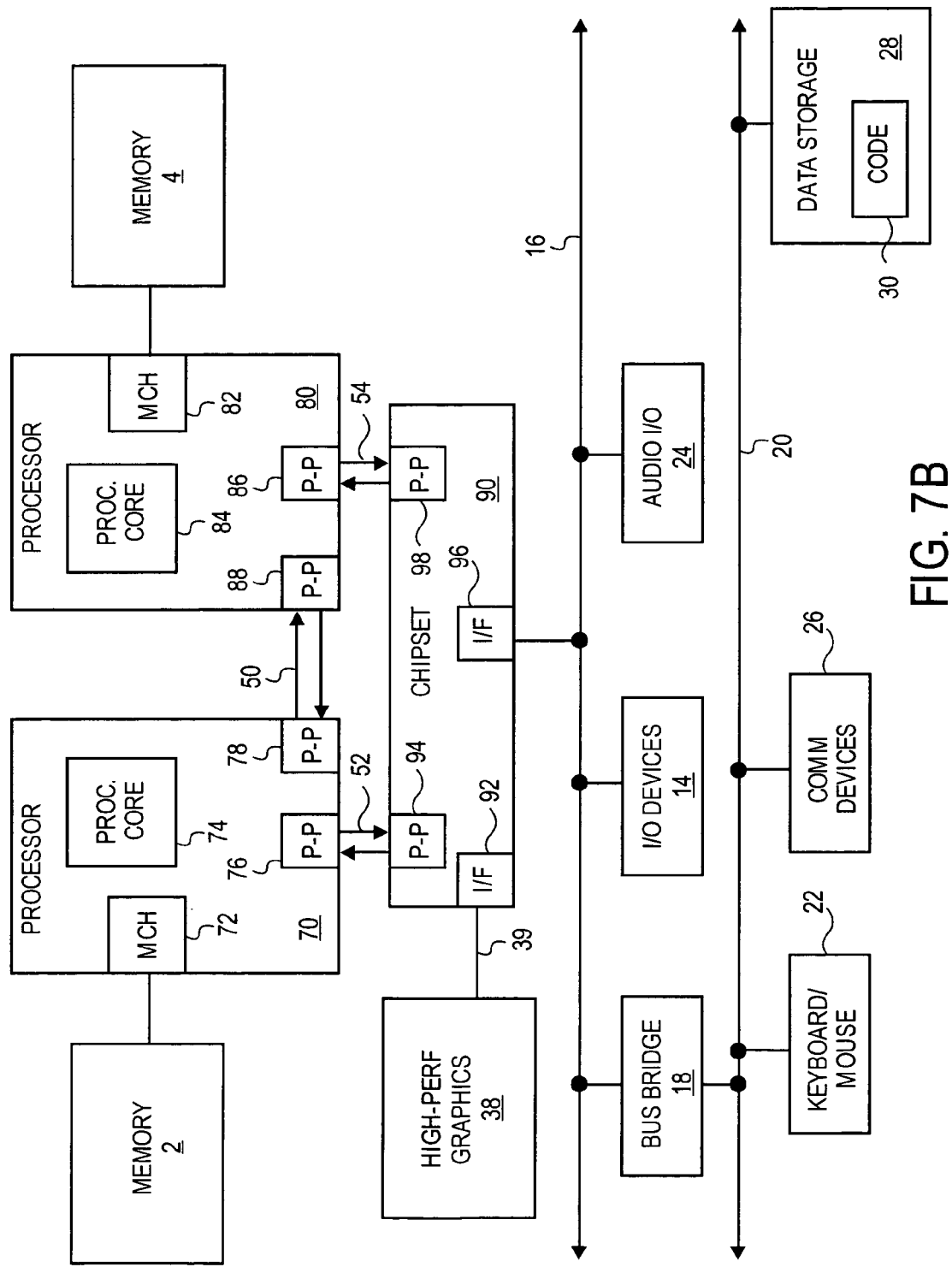

Referring now to FIGS. 7A and 7B, schematic diagrams of systems including a processor supporting execution of flow synonyms are shown, according to two embodiments of the present disclosure. The FIG. 7A system generally shows a system where processors, memory, and input/output devices are interconnected by a system bus, whereas the FIG. 7B system generally shows a system were processors, memory, and input/output devices are interconnected by a number of point-to-point interfaces.

The FIG. 7A system may include several processors, of which only two, processors 40, 60 are shown for clarity. Processors 40, 60 may include level one caches 42, 62. The FIG. 7A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be use. In some embodiments memory controller 34 and bus bridge 32 may collectively be referred to as a chipset. In some embodiments, functions of a chipset may be divided among physical chips differently than as shown in the FIG. 7A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct read data from system memory 10 to the high-performance graphics circuit 38 across high-performance graphics interface 39.

The FIG. 7B system may also include several processors, of which only two, processors 70, 80 are shown for clarity. Processors 70, 80 may each include a local memory channel hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 7A system, bus bridge 32 may permit data exchanges between system bus 6 and bus 16, which may in some embodiments be a industry standard architecture (ISA) bus or a peripheral component interconnect (PCI) bus. In the FIG. 7B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
   a decoder to implement a first and second flow synonym for a first instruction, said decoder to select at least one of said first and second flow synonym for decoding said first instruction; and
   a scheduler to schedule said selected at least one of said first and second flow synonym for execution.

2. The processor of claim 1, wherein said first flow synonym is to execute on a first execution unit and said second flow synonym is to execute on a second execution unit.

3. The processor of claim 2, wherein said first execution unit and said second execution unit are of differing types.

4. The processor of claim 2, wherein said first execution unit and said second execution unit are of differing precisions.

5. The processor of claim 1, wherein said first flow synonym and said second flow synonym are to execute on a common execution unit.

6. The processor of claim 1, wherein said decoder is to make said selection based upon processor status.

7. The processor of claim 1, wherein said decoder is to make said selection based upon a rule.

8. The processor of claim 7, wherein said rule considers a power configuration of said processor.

9. The processor of claim 7, wherein said rule considers failure status of an execution unit.

10. The processor of claim 1, further comprising a retirement module to retire whichever said first or said second flow synonym first completes execution, if both said first and second flow synonyms are schedules for execution.

11. The processor of claim 1, further comprising a retirement module to compare execution results of said first and said second flow synonym and raise an exception upon mismatch, if both said first and second flow synonyms are scheduled for execution by different execution units.

12. A method, comprising:
    determining whether each of a plurality of execution units is available; and
    if a first one of said plurality of execution units is available, then choosing a first flow synonym corresponding to said first available execution unit and further scheduling said first flow synonym for execution on said first available execution unit.

13. The method of claim 12, further comprising if none of said plurality of execution units is available, then arbitrating to select a second flow synonym from a plurality of flow synonyms.

14. The method of claim 12, further comprising if more than one of said plurality of execution units is available, then choosing said first flow synonym from a plurality of flow synonyms corresponding to one of said available execution units based upon system performance rules.

15. The method of claim 12, wherein said determining includes reading a processor status register.

16. The method of claim 15, wherein said processor status register indicates a second one of said execution units is less available due to a fault in said second one of said execution units.

17. The method of claim 15, wherein said processor status register indicates a second one of said execution units is available due to a processor reduced power mode.

18. A method, comprising:
    decoding an instruction into a first flow synonym and a second flow synonym;
    scheduling said first flow synonym and said second flow synonym for execution on a first execution unit and a second execution unit;
    executing said first flow synonym on said first execution unit; and
    executing said second flow synonym on said second execution unit.

19. The method of claim 18, further comprising retiring said first flow synonym when said first flow synonym finishes execution before said second flow synonym finishes execution.

20. The method of claim 18, further comprising raising an exception when a first execution result of said first flow synonym does not equal a second execution result of said second flow synonym.

21. A system, comprising:
    a processor including a decoder to implement a first and second flow synonym for a first instruction, said decoder to select at least one of said first and second flow synonym for decoding said first instruction, and a scheduler to schedule said selected at least one of said first and second flow synonym for execution;
    an interface to couple said processor to input/output circuitry; and
    an audio input/output circuitry coupled to said interface.

22. The system of claim 21, wherein said first flow synonym is to execute on a first execution unit and said second flow synonym is to execute on a second execution unit.

23. The system of claim 22, wherein said first execution unit and said second execution unit are of differing types.

24. The system of claim 22, wherein said first execution unit and said second execution unit are of differing precisions.

25. The system of claim 21, wherein said first flow synonym and said second flow synonym are to execute on a common execution unit.

26. The system of claim 21, wherein said decoder is to make said selection based upon processor status.

27. The system of claim 21, wherein said decoder is to make said selection based upon a rule.

28. The system of claim 27, wherein said rule considers a power configuration of said processor.

29. The system of claim 27, wherein said rule considers failure status of an execution unit.

30. The system of claim 21, further comprising a retirement module to retire whichever said first or said second flow synonym first completes execution, if both said first and second flow synonyms are scheduled for execution.

31. The system of claim 21, further comprising a retirement module to compare execution results of said first and said second flow synonym and raise an exception upon mismatch, if both said first and second flow synonyms are scheduled for execution by different execution units.

32. A processor, comprising:
    means for determining whether each of a plurality of execution units is available; and
    if said means for determining determines that a first one of said plurality of execution units is available, then means for choosing a first flow synonym corresponding to said first available execution unit and further means for scheduling said first flow synonym for execution on said first available execution unit.

33. The processor of claim 32, further comprising if said means for determining determines that none of said plurality of execution units is available, then means for arbitrating to select a second flow synonym from a plurality of flow synonyms.

34. The processor of claim 32, further comprising if said means for determining determines that more than one of said plurality of execution units is available, then means for choosing said first flow synonym from a plurality of flow synonyms corresponding to one of said available execution units based upon system performance rules.

35. The processor of claim 32, wherein said means for determining includes means for reading a processor status register.

36. The processor of claim 35, wherein said processor status register indicates a second one of said execution units is less available due to a fault in said second one of said execution units.

37. The processor of claim 35, wherein said processor status register indicates a second one of said execution units is available due to a processor reduced power mode.

38. A processor, comprising:
means for decoding an instruction into a first flow synonym and a second flow synonym;
means for scheduling said first flow synonym and said second flow synonym for execution on a first execution unit and a second execution unit;
means for executing said first flow synonym on said first execution unit; and
means for executing said second flow synonym on said second execution unit.

39. The processor of claim 38, further comprising means for retiring said first flow synonym when said first flow synonym finishes execution before said second flow synonym finishes execution.

40. The processor of claim 38, further comprising means for raising an exception when a first execution result of said first flow synonym does not equal a second execution result of said second flow synonym.

* * * * *